Figure 1:
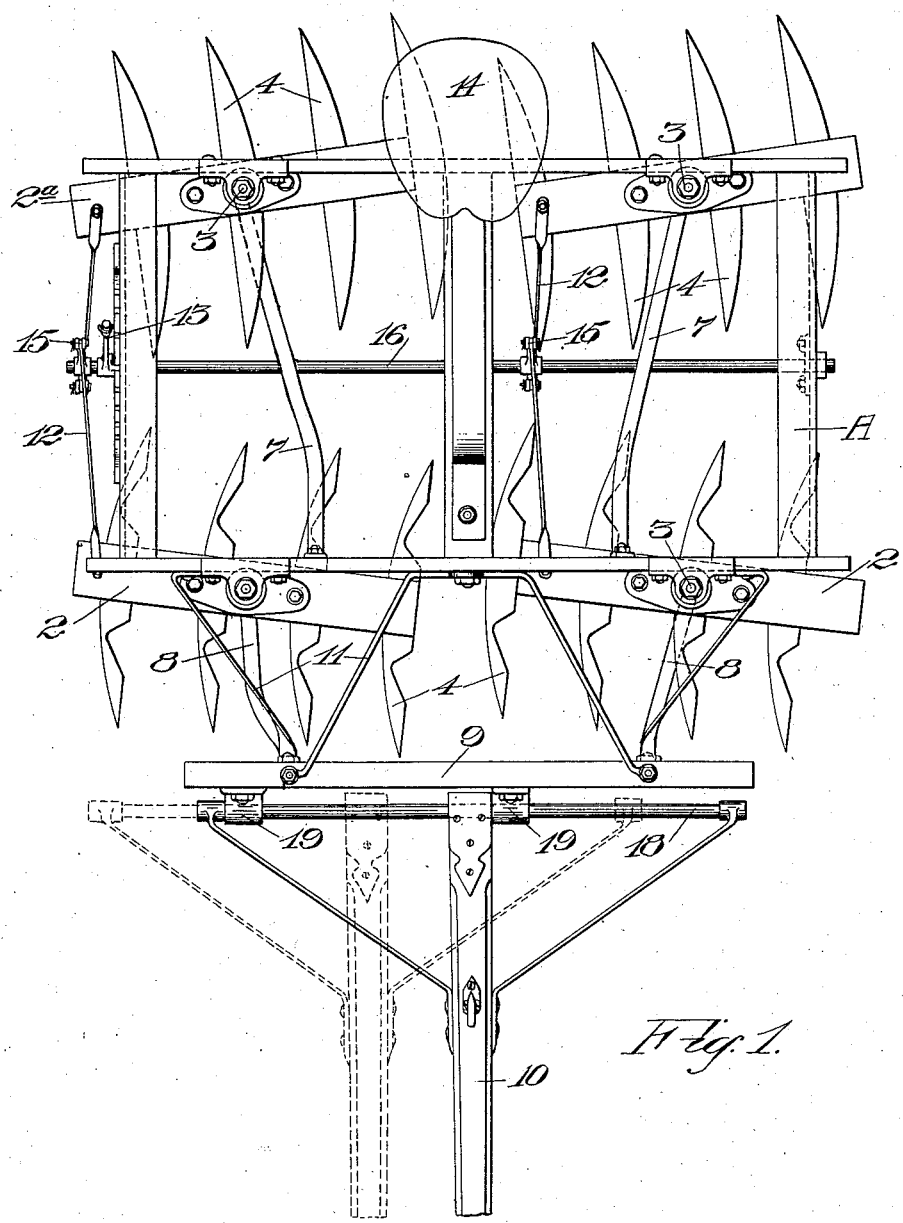

No. 842,671. PATENTED JAN. 29, 1907.
W. C. KING.
DISK HARROW.
APPLICATION FILED FEB. 16, 1906.

2 SHEETS—SHEET 1.

Witnesses. Inventor:
William C. King
By Geo. H. Strong, atty.

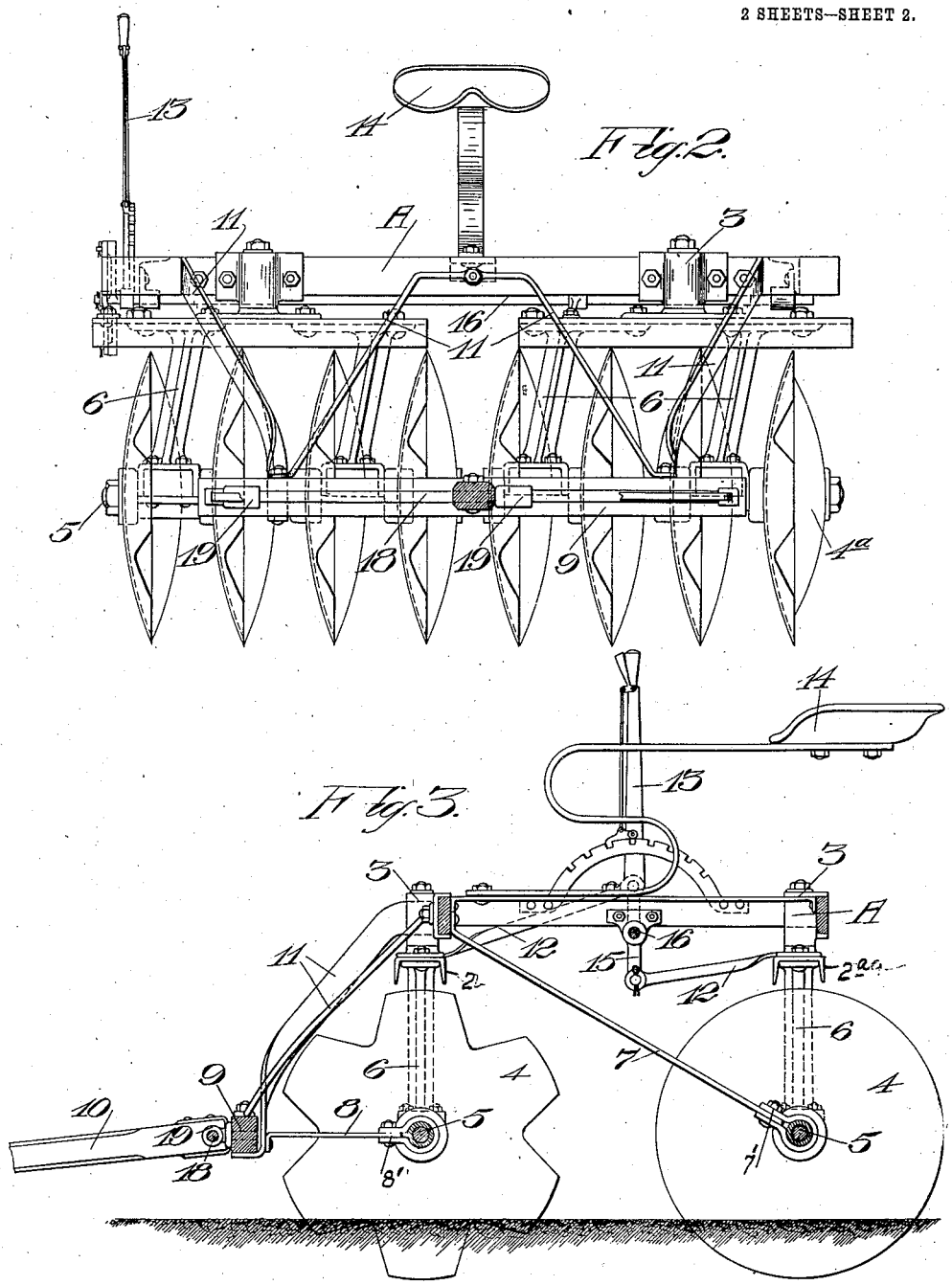

UNITED STATES PATENT OFFICE.

WILLIAM C. KING, OF CAMPBELL, CALIFORNIA, ASSIGNOR OF ONE-HALF TO W. G. AIKEN, OF CAMPBELL, CALIFORNIA.

DISK HARROW.

No. 842,671.   Specification of Letters Patent.   Patented Jan. 29, 1907.

Application filed February 16, 1906. Serial No. 301,417.

*To all whom it may concern:*

Be it known that I, WILLIAM C. KING, a citizen of the United States, residing at Campbell, in the county of Santa Clara and State of California, have invented new and useful Improvements in Disk Harrows, of which the following is a specification.

My invention relates to apparatus for cultivating the ground.

It consists in the combination of independently-mounted series of disks, means for adjusting the same, and in details of construction, which will be more fully explained by reference to the accompanying drawings, in which—

Figure 1 is a plan view of my apparatus. Fig. 2 is a front view. Fig. 3 is a sectional side elevation.

My invention is designed to provide for a more perfect cultivation and leveling of the soil by the use of revoluble disks so mounted that they may be turned with relation to each other and those behind to follow in the spaces between those in front, the adjustment being such as to balance any side draft which might otherwise occur.

As shown in the drawings, A represents a frame of any suitable or desired construction, and at the front and rear of the frame are pivoted the beams 2 and $2^a$. These beams are preferably made of channel-iron, with the open faces downward, and are pivoted, as shown at 3, so as to be turnable horizontally about the vertical pivots. The disposition of the bars 2 and their pivots are such that the pair of bars 2 are pivoted in line transversely across the machine, and the bars $2^a$ are in like manner pivoted transversely across the machine.

The disks 4 are of any suitable or desired construction and are mounted upon shafts 5, which are carried at the lower ends of standards 6. The rear standards are strongly braced by brace-rods, as at 7. The forward standards are connected by brace-rods 8 with the draft-bar 9, to which the pole 10 is connected, as will be hereinafter described. The brace-rods 7 and 8 have a swiveled or pivoted connection where they connect with the clips on the axles, as shown at 7' and 8'. The draft-bar is also connected with the main frame by brace-rods, as at 11, thus making a substantially rigid construction, and by reason of the location of the draft-bar 10 in approximately a horizontal line with the shafts 5 of the disks it will be seen that the draft is substantially in the line of said shafts, with the advantage to be gained by such line of draft. As here shown the disks are arranged in sets of four upon each of the supporting-beams 2 $2^a$, and these beams are centrally pivoted and turnable with relation to the main frame A.

In order to turn the disk-carrying beams, I have shown rods or links 12, one end of each of the links being pivoted to the outer end of one of the disk-carrying beams 2 $2^a$, and the opposite ends are connected with a hand-lever 13 within convenient reach of the driver, which may be located upon a seat, as at 14. The links 12 are connected with cranks 15, mounted upon a shaft 16, which is journaled to the main frame, and as the links from the rear may be connected with one of the crank or rocker arms—for instance, below the shaft 16—and those from the front may be connected with the rocker-arms above the shaft it will be seen that the movement of the lever will turn the beams 2 $2^a$ in opposite directions, so that they may be made to converge in pairs.

The disks mounted upon the rearmost beam $2^a$ are so disposed with relation to those upon the front beams that when the two sets of disks have been turned to stand at the desired angles the front disks will cut and pulverize the earth in certain lines, which would ordinarily leave furrows between them; but the rearmost disks, by reason of the angles at which they stand, will cut and pulverize the soil in lines between those traversed by the front disks. Thus the whole surface traversed by the harrow or cultivator will be finely pulverized, and by means of a small supplemental disk $4^a$ at the extreme outer end the last of the furrows on that side of the apparatus will be finally leveled.

The pole 10 is directly connected with a shaft 18, and this shaft is slidable in boxes 19, which are fixed to the draft-bar 9, so that if it is desired to cultivate next to trees, vines, or other shrubs the pole may be shifted by sliding in the boxes, and being shifted, as shown in dotted lines in Fig. 1, it will carry the harrow farther to one side, and thus cultivate close to trees, where the ground could not otherwise be reached.

Having thus described my invention, what I claim, and desire to secure by Letters Patent, is—

1. In a harrow, the combination of a main frame, a plurality of supplemental transversely-extending front and rear bars upon opposite sides of the center of the main frame, said bars having each a centrally-located spindle and said main frame having sockets in which said spindles are turnable, shafts carried by the bars and provided with disks, braces extending from the central portions of the shafts to the main frame, and means by which the bars are turnable in unison and to different angles.

2. In a harrow, the combination of a rectangular, rigid main frame, transversely-extending channel-bars at each side of the center of the frame and located at the front and rear ends of said frame, said bars having pendent standards and centrally-located vertical spindles, sockets on the main frame in which spindles are turnable, shafts journaled in the standards, and provided with disks, braces extending from central portions of the shafts to the main frame, and means by which the front and rear bars at either side of the center of the main frame may be turned simultaneously and to opposite angular positions.

3. In a harrow, the combination of a rectangular main frame, transversely-extending channel-bars at the front and rear of the main frame and disposed upon opposite sides of the center thereof, means turnably connecting the central portions of the bars with the main frame, disk-carrying shafts mounted on the bars, means connecting the central portions of the rear shafts with the main frame, means whereby the front and rear bars upon either side of the frame may be turned to opposite angular positions relative to each other, a draft-bar, connections between it and the front of the main frame, and connections between the front disk-shafts and the draft-bar.

In testimony whereof I have hereunto set my hand in presence of two subscribing witnesses.

WILLIAM C. KING.

Witnesses:
 R. K. THOMAS,
 JOHN L. HAGELIN.